Patented Feb. 28, 1933

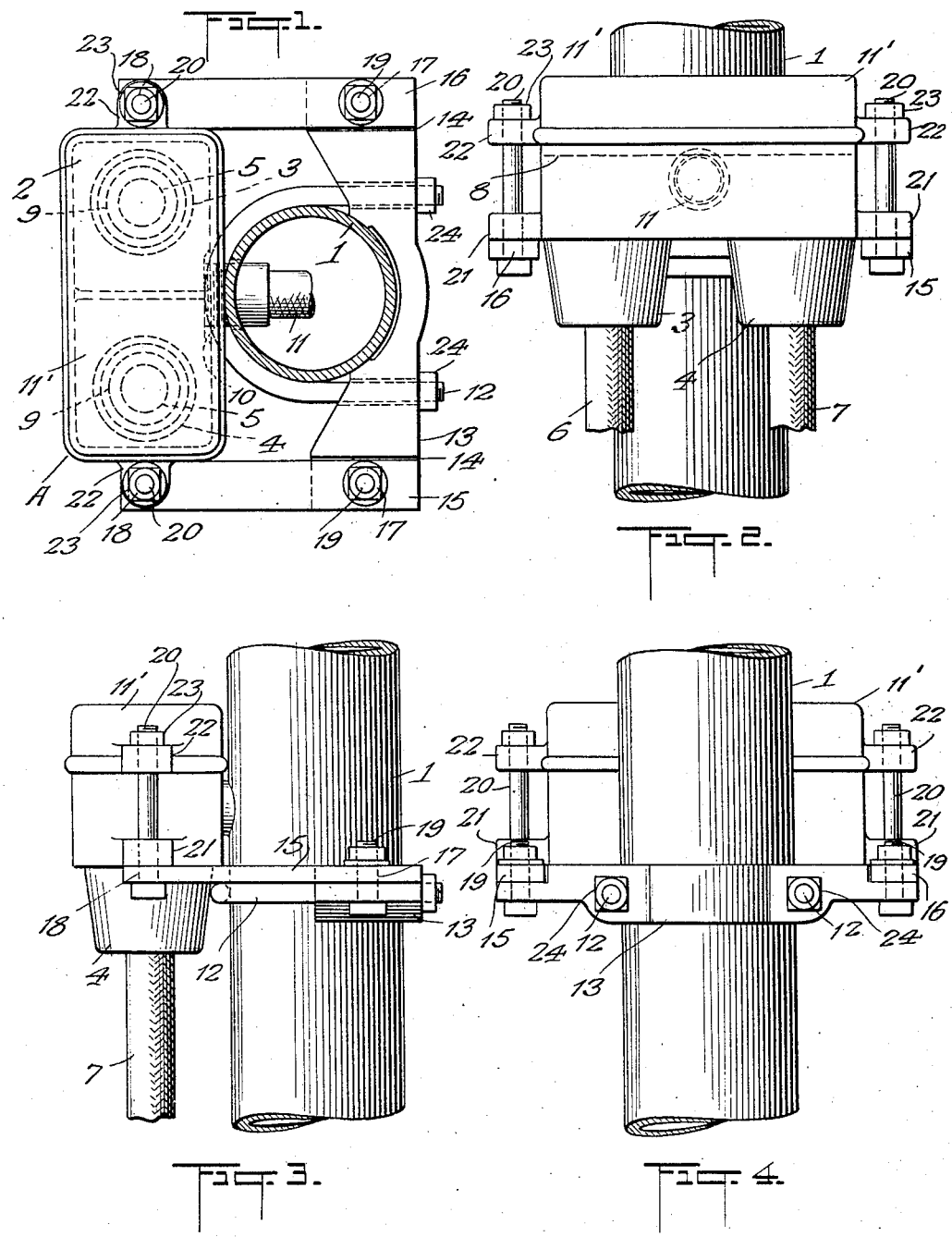

1,899,510

UNITED STATES PATENT OFFICE

WILLIAM H. B. LAVARACK, OF PINE BUSH, NEW YORK, ASSIGNOR TO RAILROAD ACCESSORIES CORPORATION, OF NEW YORK, N. Y., A CORPORATION OF NEW YORK

JUNCTION BOX

Application filed June 8, 1931. Serial No. 542,768.

This invention relates to electrical devices, particularly devices for protecting the junction of connected conductors, and more especially such devices combined with a suitable support for attachment to a vertical pole.

Those skilled in the electrical art, and particularly the art of laying and connecting electrical conductors are aware that, at times, in particular arts, as, for instance, railway signalling, there is often the necessity for joining electrical conductors which are in cable form. The connections of such conductors, in order to obviate the use of highly skilled mechanics, such, for instance, as lead workers who are used to build an air and water tight casing around the ends of two lead covered cables where joined, recourse is had to what is known as a junction box.

Heretofore junction boxes mounted upon poles have been used, but such junction boxes have been made with a portion which conforms with the curvature of the pole. This has been found to be objectionable, because if the portion which is made to conform to the pole is ample to give a good bearing then the capacity of the junction box is quite seriously diminished. Another objection is that, in order to have the most secure attachment, the portion of the junction box formed to fit the pole should be made to fit the particular size pole to which it is attached. This necessitates a large variety of junction boxes.

A principal object of this invention is to provide a junction box and support for attachment to a pole or like device, of such construction that comparatively unskilled workmen may successfully make a water tight junction between two connecting cables.

Other objects and advantages will appear as the description of the particular physical embodiments selected to illustrate the invention progresses and the novel features will be particularly pointed out in the appended claims.

In describing the invention in detail, and the particular physical embodiments selected to illustrate the invention, reference is had to the accompanying drawing and the several views thereon, in which like characters of reference designate like parts throughout the several views, and in which:

Figure 1 is a top plan view of a device embodying the invention, in place upon a pipe pole shown in section; Fig. 2, is an elevational view of the device as shown in Fig. 1 as viewed from the left side; Fig. 3, is an elevational view of the device as shown by Fig. 1 as viewed from the end; Fig. 4, is an elevation of the device as shown by Fig. 1 as viewed from the right side.

In the drawing, numeral 1 designates a pole or mast made of pipe, such as ordinary wrought iron pipe. It represents that pole or pipe which is to be found along railway tracks serving as a support for signals, relay boxes, or the like. It is ordinarily wrought iron pipe of from four to eight inches in diameter. As the numeral 1 designates a pipe which serves as support for signals, relay boxes, and the like, it is well understood that it is a support to which electrical conductors go and from which electrical conductors depart. These electrical conductors are very commonly collected, assembled, or bunched into a form known as a cable. It is well known that it is quite essential to prevent the entrance of water or moisture into the interior of a cable. In order to prevent this entrance of moisture in the case of lead sheathed cables, it is general practice to put a lead sleeve about the joined conductors extending onto the undamaged lead sheath, on each side and to then make a wiped joint between the lead sleeve and the cable. Such a joint requires skilled workmen. It is an object of this invention to obviate the use of such skilled workmen. Applicant's proposal is to project the ends of the cables into a cavity in a junction box, and after properly electrically connecting the several conductors to completely enclose the ends of the cable with an insulating compound which will exclude water, such, for instance, as bitumen.

Applicant's junction box is designated generally by A. It includes a substantially rectangular compartment 2 connecting with and positioned above two substantially well-like depressions 3 and 4. Each of the well-like depressions has an orifice, as 5, for the entrance of a cable. After the several conductors of the two cables 6 and 7 are suitably connected electrically, a sealing compound is poured into the junction box A up to a level beyond the top of the conductor and the ends of the cable, that is, up to about the line 8. This compound completely excludes moisture and water from the uncovered ends of the cables.

Applicant prefers to surround each cable with a tightly fitting disc, as 9, with the disc resting against the bottom of the well, as 4, so as to materially assist in preventing the molten insulating compound from flowing out of the junction box around the cable entrance and assist in centering the cable.

The junction box A is also preferably provided with an orifice 10 in the side thereof. This orifice is preferably provided with a screw thread to receive a standard pipe plug so that it may be completely closed by the plug, or, if necessary, a cable, as 11, may be passed through the orifice 10 after the removal of the plug. This provides a means for carrying conductors from the junction box A up along the pole 1 to any electrical apparatus supported thereby.

The junction box is provided with a cover 11' which fits tightly against the lower section.

In order to support the junction box, applicant provides a U-bolt 12 having the legs of the U pass through a pole saddle 13. The ends of the saddle are provided with threaded seats 14. On each seat rests a bar, as 15 and 16. Each of the bars, as 15 and 16, are orificed at two places as, at 17 and 18. An orifice, as 17, receives a bolt, as 19, for holding the bar firmly to the pipe saddle 13. The orifice 18 receives a bolt 20 which passes through a bar, as 15, a lug as 21, one of which is on each end of the box A, and also through a lug 22, one of which is on each end of the cover portion 11'. Above the lug 22 is a nut as 23. By the construction described it will be seen that the lower portion of the junction box A is supported by the lugs, as 21, upon the bars, as 15 and 16, and the cover 11' of the box is drawn tightly to the base portion of the box and the base portion held in place on the bars 15 and 16 by bolts, as 20.

The construction described is such that a junction box may be positioned at any point upon a pole, as 1. It is readily adjusted vertically to the pole and may be swung about the pole so as to be tangent to the pole at any particular point. The construction enables a box to be supported by a pole of any size at any distance from the pole merely by varying the length of the members as 15 and 16.

The construction is such that the saddle 13 conforming to the contour of the pole enables the saddle to be affixed firmly to the pole by means of the U-bolt 12 and nuts as 24, and does not necessitate a portion of the box A being curved to conform with the contour of the pole, as usual, so that the insulating compound chambers are not decreased in capacity, but are ample to receive a sufficient quantity of insulating compound to quite thoroughly exclude water and moisture from the ends of the cable.

Although I have particularly described a particular physical embodiment of my invention and explained the principle and construction thereof, nevertheless, I desire to have it understood that the form selected is merely illustrative but does not exhaust the possible physical embodiments of the idea of means underlying my invention.

What I claim as new and desire to secure by Letters Patent of the United States, is:

1. In a combined junction box and support, in combination: a substantially box-like structure formed with depending wells, each formed with an orifice in its lower wall adapted for the reception of cable ends, the wall of said box-like structure being further formed with a threaded orifice adapted alternatively for receiving a cable or a standard pipe plug; lugs, one at each end of the box-like structure; orificed means positioned under each lug and adapted to serve as supports; a cover for the box-like structure, said cover provided with orificed lugs aligning with the lugs of the box-like structure; and bolts passing through the orifices of the support, through the lugs on the box-like structure, and through the lugs on the cover for retaining the cover firmly to the box-like structure and the structure to the supports.

2. As a support for a junction box, in combination: a pipe saddle orificed to receive the legs of a U-bolt and formed with a shouldered seat at each end, each seat being formed with an orifice; bar supports, extending at a right angle to the saddle, each orificed at two places; bolts, one passing through an orifice of each seat and an orifice of a bar support, attaching the bar support firmly to a seat; bolts, one passing through each of the remaining orifices of each bar; and means, lying adjacent the pipe on the opposite side to which the saddle is bolted, fastened to the bars by the last mentioned bolts.

WILLIAM H. B. LAVARACK.